United States Patent Office 3,772,322
Patented Nov. 13, 1973

3,772,322
1-CARBAMOYL-2-CARBOALKOXYAMINO BENZIMIDAZOLES
Gerhard Horlein, Frankfurt am Main, Hilmar Mildenberger, Kelkheim, Taunus, Arno Kroniger, Gerbrunn, near Wurzburg, and Kurt Hartel, Hofheim, Taunus, Germany, assignors to Farbwerke Hoechst Aktiengesellschaft vormals Meister Lucius & Bruning, Frankfurt am Main, Germany
No Drawing. Filed Sept. 7, 1971, Ser. No. 178,459
Claims priority, application Germany, Sept. 7, 1970, P 20 44 205.1
Int. Cl. C07d 49/38
U.S. Cl. 260—309.2
10 Claims

ABSTRACT OF THE DISCLOSURE

Benzimidazols of the formula

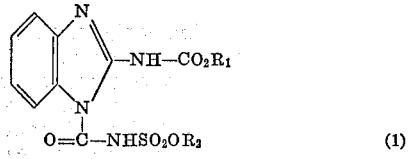

wherein $R_1$ is lower alkyl and $R_2$ is lower alkyl, haloalkyl, alkoxy-alkyl or a radical of the formula

These compounds have anthelmintic, acaricidal, ovicidal and fungicidal activity.

---

The present invention relates to novel benzimidazoles of the Formula 1

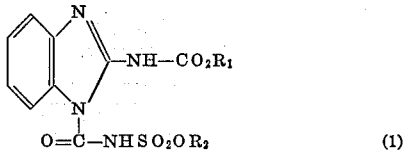

in which $R_1$ is alkyl having 1 to 4 carbon atoms, $R_2$ is alkyl having 1 to 4 carbon atoms optionally substituted by halogen or alkoxy having 1 to 4 carbon atoms, or a radical of the Formula 2

in which $R_3$, $R_4$ and $R_5$ are hydrogen, n-alkyl of 1 to 6 carbon atoms or halogen, or one of $R_3$, $R_4$ and $R_5$ is branched alkyl of 3 to 6 carbon atoms, alkoxy of 1 to 4 carbon atoms, alkoxycarbonyl of 1 to 4 carbon atoms in the alkoxy group, cyano, nitro, trifluoromethyl or phenyl when the others are hydrogen.

Among the benzimidazoles of the Formula 1 those are preferred in which $R_1$ is alkyl having 1, 2, 3 or 4 carbon atoms and $R_2$ is alkyl having 1 to 3 carbon atoms optionally substituted by one or several chlorine and/or fluorine atoms, or a radical of the Formula 2 in which $R_3$, $R_4$ and $R_5$ are identical or different and each is hydrogen, alkyl having 1 to 4 carbon atoms, alkoxy having 1 or 2 carbon atoms, carbalkoxy having 1 or 2 carbon atoms, chlorine, bromine, trifluoromethyl or cyano.

The present invention also relates to a process for the manufacture of benzimidazoles of the Formula 1 which comprises reacting a carbalkoxy-aminobenzimidazole of the Formula 3 with an alkoxy- or aryloxy-sulfonyl isocyanate of the Formula 4 as follows:

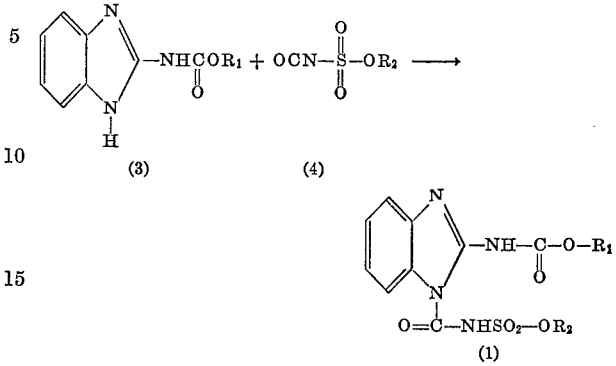

To carry out the reaction the benzimidazole derivative (3) is first suspended in an inert solvent while stirring and the liquid or solid isocyanate (4) is added, whereupon the exothermic reaction starts. In general, the reaction product separates in the form of crystals after a short period of time.

To complete the reaction, the reaction mixture is preferably stirred for 10 to 25 hours. After that the reaction product, which is obtained in a good to very good yield, is separated from the reaction mixture by filtration.

Suitable inert solvents to carry out the reaction are preferably those which are slightly or weakly polar and have a low boiling point, for example methylene chloride, carbon tetrachloride, benzene; ethers such as diethyl ether or tetrahydrofurane; esters such as methyl acetate, and preferably chloroform.

The carbalkoxy-aminobenzimidazoles used as starting material may be prepared by reacting the sulfate salt of a S-alkyl-pseudothiourea (obtained from dialkyl sulfate and thiourea) with two equivalents of a chloroformic acid ester of the general formula $ClCO_2R_1$. The product thus obtained reacts with ortho-phenylene diamine to yield the desired carbalkoxy-aminobenzimidazole (cf. J. Amer. Chem. Soc., vol. 56, p. 144 (1934)).

The alkylsulfonyl isocyanates used can be prepared by the process described in German Pat. 1,300,556. In this process the sulfochloride prepared from chlorosulfonyl isocyanate and 2,4,6-trichlorophenol is reacted with the corresponding alcohols and the reaction product obtained is heated at 120–140° C.

The phenyloxy-sulfonyl isocyanates are prepared by the process disclosed in German Pat. 1,230,017 by heating at 120 to 130° C. the corresponding phenols with at least 1 mol of chlorosulfonyl isocyanate in chlorobenzene.

Halogen-substituted alkoxy-sulfonyl isocyanates are obtained in the same way by reacting the corresponding α-halogenated alcohols with chlorosulfonyl isocyanate.

The following sulfonyl isocyanates (4) are preferably used as starting material: methoxy, ethoxy, propoxy, butoxy-, or cyclohexyloxy-sulfonyl isocyanate; 2-chloroethoxy-, 2,2,2-trichloroethoxy-, 2,2,2-trifluoroethoxy-, 2-methoxyethoxy- or 2-ethoxyethoxy-sulfonyl isocyanate; phenoxy-, 3-chlorophenoxy-, 2-chlorophenoxy-, 2,3-dichlorophenoxy-, 2,5-dichlorophenoxy-, 2,4-dichlorophenoxy-, 2,6 - dichlorophenoxy-4-chlorophenoxy-, 3,4-dichlorophenoxy-, 3,5-dichlorophenoxy-, 2,4,5-trichlorophenoxy-, or 2,4,6 - trichlorophenoxy - sulfonyl isocyanate; the corresponding bromo- and fluoro-derivatives, as well as mixed halogen-derivatives, for example 2-chloro-4-bromophenoxysulfonyl isocyanate; 2-methylphenoxy-, 3-methylphenoxy-, 4-methylphenoxy-, 2,3-, 2,4-, and 2,6-dimethylphenoxy-, or 2,4,6-trimethylphenoxy-sulfonyl isocyanate; the corresponding ethyl, propyl, isopropyl, butyl, isobu tyl-, or tert.butyl derivatives, as well as the mixed derivatives.

It has also possible to use phenoxysulfonyl isocyanates containing both halogen and alkyl, for example, 2-chloro-6-methyl-, 2-chloro-4-methyl-, 4-chloro-2-methyl-, 4-chloro-3-methyl-, 4-chloro-2,6-dimethyl-, 6-chloro-2,4-dimethyl-, 2,6-dichloro-4-methyl-, 4,6-dichloro - 2 - methyl-, 4,6-dibromo-2-methyl-phenoxysulfonyl isocyanate; phenoxysulfonyl isocyanates substituted in 2-, 3-, 4-, and/or 6-position by cyano, nitro and/or trifluoromethyl groups; 2-methoxy-, 3-methoxy-, 4-methoxy-, 2-ethoxy-, 4-ethoxy-, 2-carbethoxy-phenoxysulfonyl isocyanates, 4-phenylphenoxy- or phenylazophenoxy-sulfonyl isocyanate. Especially preferred are alkoxy- and phenoxysulfonyl isocyanates carrying one or several chlorine atoms.

The benzimidazoles according to the present invention are characterized by a good anthelmintic effect, especially against ascarides and oxyuris. Moreover, they have an acaricidal, ovicidal and particularly a fungicidal action. They are well absorbed by the leaves and roots of plants and thus act as systemic fungicides. They can be used to combat fungus diseases of plants either prophylactically or curatively.

The present invention therefore also relates to plant protecting agents, especially fungicides, containing as active ingredients benzimidazoles of the general Formula 1 in the usual preparations in admixture with solid or liquid carrier substances, adhesives, wetting agents, dispersion media and grinding auxiliaries. They can be used in the form of wettable powders, emulsions, suspensions, dusts or granules. If desired, they can be mixed with other fungicides with which they form compatible mixtures.

Suitable carrier materials are mineral substances such as aluminum silicates, argillaceous earths, kaolin, chalk, siliceous chalk, talc, kieselguhr or hydrated silicic acid, or preparations of said mineral substances with special additives, for example chalk with sodium stearate. Carrier materials for liquid preparations are all suitable and common solvents, for example toluene, xylene, diacetone alcohol, cyclohexanone, isophorone, gasolines, paraffin oils, dioxane, dimethyl formamide, dimethyl sulfoxide, ethyl acetate, tetrahydrofurance, chlorobenzene and the like.

As adhesives there can be used glutainous cellulose products or polyvinyl alcohols.

As wetting agents there can be used all suitable emulsifiers such as hydroxyethylated alkylphenols, salts of aryl or alkylaryl-sulfonic acids, salts of oleylmethyltaurine, salts of phenyl alkyl (12–16 C)-sulfonic acids or soaps.

Suitable dispersion media are salts of lignin-sulfonic acid, salts of naphthalene-sulfonic acid or salts of oleylmethyl-taurine.

As grinding auxiliaries suitable inorganic or organic salts can be used, for example sodium sulfate, ammonium sulfate, sodium carbonate, sodium bicarbonate, sodium thiosulfate, sodium stearate or sodium acetate.

The following examples illustrate the invention.

(A) PREPARATION OF BENZIMIDAZOLES ACCORDING TO THE INVENTION (The Roman numerals used in this series are used in the examples of application to designate the compound used.)

Example I 1-(2'-chloro - 4 - bromophenoxysulfonylcarbamoyl)-2-carbomethoxy - aminobenzimidazole (I).—12 parts by weight of 2-carbomethoxy-aminobenzimidazole were suspended in 500 parts by volume of absolute chloroform. 20 parts by weight of 2-chloro-4-bromophenoxysulfonyl isocyanate were added while stirring. After 15 to 20 minutes the reaction mixture became distinctly brighter and the reaction product separated in the form of crystals. To complete the reaction, the reaction mixture was stirred for another 20 hours at room temperature. The crystals were then filtered off, washed with chloroform and dried at room temperature in high vacuum. 27 parts by weight of pure reaction product were obtained, corresponding to a yield of 85% of the theory. The product melted at 161–162° C. with decomposition.

*Analysis.*—Calcd. for $C_{16}H_{12}BrClN_4O_6S$ (503.5) (percent): C, 38.2; H, 2.4; N, 11.1; S, 6.4; Br, 15.9; Cl, 7.1. Found (percent): C, 38.3; H, 2.4; N, 11.1; S, 6.5; Br, 16.0; Cl, 7.0.

The compounds listed in the following table were prepared in an analogous manner.

| Number | Chemical designation | Decomposition, °C. | Summation formula (mol. weight), analysis values in percent |
|---|---|---|---|
| II | 1-phenoxysulfonylcarbamoyl-2-carbomethoxyaminobenzimidazole | 155 | $C_{16}H_{14}N_4O_6S$ (390)<br>Calc: C, 49.2; H, 3.6; N, 14.4; S, 8.2<br>Found: C, 49.2; H, 3.9; N, 14.8; S, 8.0 |
| III | 1-(4'-chlorophenoxysulfonylcarbamoyl)-2-carbomethoxyaminobenzimidazole. | 167–168 | $C_{16}H_{13}ClN_4O_6S$ (424.5)<br>Calc: C, 45.3; H, 3.1; N, 13.2; S, 7.6<br>Found: C, 44.9; H, 3.8; N, 13.1; S, 7.7 |
| IV | 1-(4'-methoxyphenoxysulfonylcarbamoyl)-2-carbomethoxyaminobenzimidazole. | 160–161 | $C_{17}H_{16}N_4O_7S$ (420)<br>Calc: C, 48.5; H, 3.8; N, 13.3; S, 7.6<br>Found: C, 48.4; H, 4.4; N, 13.6; S, 7.6 |
| V | 1-(2',4'-dimethylphenoxysulfonylcarbamoyl)-2-carbomethoxyaminobenzimidazole. | 158–159 | $C_{18}H_{18}N_4O_6S$ (418) |
| VI | 1-(2'-methylphenoxysulfonylcarbamoyl)-2-carbomethoxyaminobenzimidazole. | 160–162 | $C_{17}H_{16}N_4O_6S$ (404=<br>Calc: N, 13.9; S, 7.9<br>Found: N, 13.8; S, 7.5 |
| VII | 1-(3'-methylphenoxysulfonylcarbamoyl)-2-carbomethoxyaminobenzimidazole. | 161–162 | $C_{17}H_{16}N_4O_6S$ (404)<br>Calc: C, 50.5; H, 4.0; N, 13.9; S, 7.9<br>Found: C, 50.4; H, 4.2; N, 13.8; S, 8.0 |
| VIII | 1-(4'-t-butylphenoxysulfonylcarbamoyl)-2-carbomethoxyaminobenzimidazole. | 174 | $C_{20}H_{23}N_4O_6S$ (447)<br>Calc: C, 53.6; H, 5.2; N, 12.5; S, 7.2<br>Found: C, 53.7; H, 5.0; N, 12.6; S, 6.9 |
| IX | 1(2'-chloro-4'-methylphenoxysulfonylcarbamoyl)-2-carbomethoxyaminobenzimidazole. | 161–162 | $C_{17}H_{15}ClN_4O_6S$ (438.5)<br>Calc: N, 12.8; S, 7.3<br>Found: N, 12.5; S, 7.0 |
| X | 1-(2'-methyl-4',6'-dibromphenoxysulfonylcarbamoyl)-2-carbomethoxyaminobenzimidazole. | 180–181 | $C_{17}H_{14}Br_2N_4O_6S$ (562)<br>Calc: N, 10.0; S, 5.7<br>Found: N, 10.4; S, 6.0 |
| XI | 1-(2'-chloro-6'-methylphenoxysulfonylcarbamoyl)-2-carbomethoxyaminobenzimidazole. | 159–161 | $C_{17}H_{15}ClN_4O_6S$ (438.5)<br>Calc: C, 46.5; H, 3.4; N, 12.8; S, 7.3<br>Found: C, 46.0; H, 3.6; N, 12.2; S, 7.0 |
| XII | 1-(2'-6'-dichlorophenoxysulfonylcarbamoyl)-2-carbomethoxyaminobenzimidazole. | 156–158 | $C_{16}H_{12}Cl_2N_4O_6$ (459)<br>Calc: N, 12.2; S, 7.0<br>Found: N, 12.3; S, 6.7 |

TABLE—Continued

| Number | Chemical designation | Decomposition, °C. | Summation formula (mol. weight), analysis values in percent |
|---|---|---|---|
| XIII | 1-(2',4'-dichlorophenoxysulfonylcarbamoyl)-2-carbomethoxyaminobenzimidazole. | 151–153 | $C_{16}H_{12}Cl_2N_4O_6S$ (459)<br>Calc: C, 41.8; H, 2.6; N, 12.2; S, 7.0<br>Found: C, 41.6; H, 2.9; N, 12.4; S, 7.2 |
| XIV | 1-(2',4',6'-trimethylphenoxysulfonylcarbamoyl)-2-carbomethoxyaminobenzimidazole. | 168–169 | $C_{19}H_{20}N_4O_6S$ (432) |
| XV | 1-(2',6'-diethylphenoxysulfonylcarbamoyl)-2-carbomethoxyaminobenzimidazole. | 162–165 | $C_{20}H_{22}N_4O_6S$ (446)<br>Calc: C, 53.8; H, 4.9; N, 12.5; S, 7.2<br>Found: C, 54.1; H, 5.0; N, 12.6; S, 7.1 |
| XVI | 1-(4'-bromophenoxysulfonylcarbamoyl)2-carbomethoxyaminobenzimidazole. | 178 | $C_{16}H_{13}BrN_4O_6S$ (469) |
| XVII | 1-(2'-methyl-4',6'-dichlorophenoxysulfonylcarbamoyl)-2-carbomethoxyaminobenzimidazole. | 181–182 | $C_{17}H_{14}Cl_2N_4O_6S$ (473)<br>Calc: C, 43.1; H, 3.0; N, 11.8; S, 6.8<br>Found: C, 43.1; H, 3.2; N, 12.1; S, 7.0 |
| XVIII | 1-(2'-ethoxyphenoxysulfonylcarbamoyl)-2-carbomethoxyaminobenzimidazole. | 170 | $C_{18}H_{18}N_4O_7S$ (434)<br>Calc: N, 12.9; S, 7.4<br>Found: N, 12.9; S, 7.5 |
| XIX | 1-(2'-methyl-4'-chlorophenoxysulfonylcarbamoyl)-2-carbomethoxyaminobenzimidazole. | 165 | $C_{17}H_{15}ClN_4O_6S$ (438.5)<br>Calc: C, 46.5; H, 3.4; N, 12.8; S, 7.3<br>Found: C, 46.6; H, 3.7; N, 12.8; S, 7.4 |
| XX | 1-(4'-cyanophenoxysulfonylcarbamoyl)-2-carbomethoxyaminobenzimidazole. | 97 | $C_{17}H_{13}N_5O_6S$ (415)<br>Calc: S, 7.7<br>Found: S, 7.1 |
| XXI | 1-(2'-methoxyphenoxysulfonylcarbamoyl)-2-carbomethoxyaminobenzimidazole. | 156 | $C_{17}H_{16}N_4O_7S$ (420)<br>Calc: C, 48.5; H, 3.8; N, 13.3; S, 7.6<br>Found: C, 48.5; H, 4.1; N, 13.1; S, 7.4 |
| XXII | 1-(4'-ethoxyphenoxysulfonylcarbamoyl)-2-carbomethoxyaminobenzimidazole. | 134 | $C_{18}H_{18}N_4O_7S$ (434)<br>Calc: N, 12.9<br>Found: N, 12.2 |
| XXIII | 1-(3'-chlorophenoxysulfonylcarbamoyl)-2-carbomethoxyaminobenzimidazole. | 163 | $C_{16}H_{13}ClN_4O_6S$ (424.5)<br>Calc: C, 45.3; H, 3.1; N, 13.2; S, 7.6<br>Found: C, 44.3; H, 3.0; N, 13.0; S, 7.4 |
| XXIV | 1-(2',6'-dichloro-4'-methylphenoxysulfonylcarbamoyl)-2-carbomethoxyaminobenzimidazole. | 153–155 | $C_{17}H_{14}Cl_2N_4O_6S$ (473)<br>Calc: C, 43.1; H, 3.0; N, 11.8; S, 6.8<br>Found: C, 42.7; H, 3.0; N, 11.8; S, 6.8 |
| XXV | 1-(2',4',6'-trichlorophenoxysulfonylcarbamoyl)-2-carbomethoxyaminobenzimidazole. | 170 | $C_{16}H_{11}Cl_3N_4O_6S$ (493.5)<br>Calc: C, 38.9; H, 2.2; N, 11.3; S, 6.5<br>Found: C, 39.0; H, 2.3; N, 11.6; S, 6.4 |
| XXVI | 1-(4'-methylphenoxysulfonylcarbamoyl)-2-carbomethoxyaminobenzimidazole. | 162–164 | $C_{17}H_{16}N_4O_6S$ (404)<br>Calc: N, 13.9; S, 7.9<br>Found: N, 14.1; S, 7.7 |
| XXVII | 1-(3'-carbomethoxyphenoxysulfonylcarbamoyl)-2-carbomethoxyaminobenzimidazole. | 115–120 | $C_{18}H_{16}N_4O_8S$ (416)<br>Calc: N, 13.5; S, 7.7<br>Found: N, 13.9; S, 7.8 |
| XXVIII | 1-(2',5'-dimethylphenoxysulfonylcarbamoyl)-2-carbomethoxyaminobenzimidazole. | 190–194 | $C_{18}H_{18}N_4O_6S$ (418)<br>Calc: N, 13.4; S, 7.6<br>Found: N, 13.6; S, 7.8 |
| XXIX | 1-(2',6'-dimethylphenoxysulfonylcarbamoyl)-2-carbomethoxyaminobenzimidazole. | 165 | $C_{18}H_{18}N_4O_6S$ (418)<br>Calc: N, 13.4; S, 7.6<br>Found: N, 13.8; S, 7.6 |
| XXX | 1-methoxysulfonylcarbamoyl-2-carbomethoxyaminobenzimidazole. | 132–135 | $C_{11}H_{12}N_4O_6S$ (328)<br>Calc: N, 17.1; S, 9.8<br>Found: N, 17.0; S, 9.7 |
| XXXI | 1-ethoxysulfonylcarbamoyl-2-carbomethoxyaminobenzimidazole. | 124 | $C_{12}H_{14}N_4O_6S$ (342)<br>Calc: C, 42.1; H, 4.1; N, 16.4; S, 9.4<br>Found: C, 42.0; H, 4.1; N, 16.2; S, 9.1 |
| XXXII | 1-(2',2',2'-trichloroethoxysulfonylcarbamoyl)-2-carbomethoxyaminobenzimidazole. | 172–174 | $C_{12}H_{11}Cl_3N_4O_6S$ (445.5)<br>Calc: Cl, 23.8; N, 12.6<br>Found: Cl, 23.6; N, 12.6 |
| XXXIII | 1-propyloxysulfonylcarbamoyl-2-carbomethoxyaminobenzimidazole. | 148 | $C_{13}H_{16}N_4O_6S$ (356)<br>Calc: C, 43.8; H, 4.5; S, 9.0<br>Found: C, 44.0; H, 5.3; S, 9.4 |
| XXXIV | 1-(2',4',6'-trichlorophenoxysulfonylcarbamoyl)-2-carboethoxyaminobenzimidazole. | 171–177 | $C_{17}H_{13}Cl_3N_4O_6S$ (507.5)<br>Calc: C, 40.2; H, 2.6; N, 11.0; S, 6.4<br>Found: C, 40.1; H, 2.6; N, 11.3; S, 6.5 |
| XXXV | 1-(2',6'-dichloro-4'-methylphenoxysulfonylcarbamoyl)-2-carboethoxyaminobenzimidazole. | 164–167 | $C_{18}H_{16}Cl_2N_4O_6S$ (487)<br>Calc: C, 44.3; H, 3.3; N, 11.5; S, 6.6<br>Found: C, 44.5; H, 3.4; N, 11.6; S, 6.8 |
| XXXVI | 1-(3'-chlorophenoxysulfonylcarbamoyl)-2-carboethoxyaminobenzimidazole. | 174 | $C_{17}H_{15}ClN_4O_6S$ (438.5)<br>Calc: C, 46.5; H, 3.4; N, 12.8; S, 7.3<br>Found: C, 46.4; H, 3.6; N, 12.6; S, 7.2 |
| XXXVII | 1-(2',4'-dichloro-6'-methylphenoxysulfonylcarbamoyl)-2-carboethoxyaminobenzimidazole. | _____ | $C_{18}H_{16}Cl_2N_4O_6S$ (487)<br>Calc: C, 44.3; H, 3.3; N, 11.5; S, 6.6<br>Found: C, 44.3; H, 3.5; N, 11.5; S, 6.7 |
| XXXVIII | 1-(2'-chlorophenoxysulfonylcarbamoyl)-2-carbomethoxyaminobenzimidazole. | 152 | $C_{16}H_{13}ClN_4O_6S$ (424.5)<br>Calc: C, 45.3; H, 3.1; N, 13.2; S, 7.6<br>Found: C, 45.1; H, 3.4; N, 13.3; S, 7.9 |
| XXXIX | 1-(2',4',5'-trichlorophenoxysulfonylcarbamoyl)-2-carbomethoxyaminobenzimidazole. | 159–160 | $C_{16}H_{11}Cl_3N_4O_6S$ (493.5)<br>Calc: C, 38.9; H, 2.2; N, 11.3; S, 6.5<br>Found: C, 39.0; H, 2.2; N, 11.6; S, 6.7 |

TABLE—Continued

| Number | Chemical designation | Decomposition, °C. | Summation formula (mol. weight), analysis values in percent |
|---|---|---|---|
| XL | 1-(3',4'-dichlorophenoxysulfonylcarbamoyl)-2-carbomethoxyaminobenzimidazole. | 159–162 | $C_{16}H_{12}Cl_2N_4O_6S$ (459)<br>Calc: C, 41.8; H, 2.6; N, 12.2; S, 7.0<br>Found: C, 41.6; H, 2.6; N, 12.1; S, 6.9 |
| XLI | 1-(2',3'-dichlorophenoxysulfonylcarbamoyl)-2-carbomethoxyaminobenzimidazole. | 155–157 | $C_{16}H_{12}Cl_2N_4O_6S$ (459)<br>Calc: C, 41.8; H, 2.6; N, 12.2; S, 7.0<br>Found: C, 41.5; H, 2.7; N, 12.4; S, 6.8 |
| XLII | 1-(3',5'-dichlorophenoxysulfonylcarbamoyl)-2-carbomethoxyaminobenzimidazole. | 159–160 | $C_{16}H_{12}Cl_2N_4O_6S$ (459)<br>Calc: C, 41.8; H, 2.6; N, 12.2; S, 7.0<br>Found: C, 41.4; H, 2.6; N, 12.4; S, 6.7 |
| XLIII | 1-(2',5'-dichlorophenoxysulfonylcarbamoyl)-2-carbomethoxyaminobenzimidazole. | 152 | $C_{16}H_{12}Cl_2N_4O_6S$ (459)<br>Calc: C, 41.8; H, 2.6; N, 12.2; S, 7.0<br>Found: C, 41.4; H, 2.7; N, 12.4; S, 7.0 |
| XLIV | 1-(1',3'-dichloropropoxy-(2')-sulfonylcarbamoyl)-2-carbomethoxyaminobenzimidazole. | 154 | $C_{13}H_{14}Cl_2N_4O_6S$ (425)<br>Calc: C, 36.7; H, 3.3; N, 13.2; S, 7.5<br>Found: C, 38.8; H, 3.7; N, 13.4; S, 7.6 |
| XLV | 1-(2',2',2'-trifluoroethyoxsulfonylcarbamoyl)-2-carbomethoxyaminobenzimidazole. | 171 | $C_{12}H_{11}F_3N_4O_6S$ (396) |
| XLVI | 1-(3'-trifluoromethylphenoxysulfonylcarbamoyl)-2-carbomethoxyaminobenzimidazole. | 149–150 | $C_{17}H_{13}F_3N_4O_6S$ (458) |

(B) EXAMPLES OF APPLICATION

Example 1

Cucumbers in the three-leave stage were strongly infested with conidia of cucumber mildew (*Erysiphe cichoracearum*) and five days after the infestation the plants were drip-sprayed with liquors containing decreasing amounts of the following compounds: XXX, XXVII, XXVI, XXXII, XXV, III, II, IV, VI, VII, and V.

As comparative agent a commercial preparation on the basis of dinocap (2,4 - dinitro - 6 - (2 - octyl)-phenylcrotonate) was used. The active ingredients were applied in concentrations of 100, 50, 25, 12, 6, 3, 1.5 and 0.75 milligrams per liter of spray liquor. After drying of the liquor the plants were placed in the greenhouse and the degree of infestation was evaluated after two weeks.

The following Table 1 shows that the novel compounds have an excellent efficiency superior to that of the comparative substance.

TABLE 1

| Compound | Efficiency in percent against *Erysiphe cichoracearum* with mg. of active ingredient per liter of spray-liquor of— | | | | | | | |
|---|---|---|---|---|---|---|---|---|
| | 100 | 50 | 25 | 12 | 6 | 3 | 1.5 | 0.75 |
| XXX | 100 | 100 | 100 | 100 | 100 | 97 | 95 | 90 |
| XXVII | 100 | 100 | 99 | 97 | 95 | 90 | 85 | 70 |
| XXVI | 100 | 100 | 99 | 97 | 95 | 90 | 85 | 75 |
| XXXII | 100 | 100 | 100 | 98 | 97 | 95 | 85 | 70 |
| XXV | 100 | 100 | 100 | 100 | 98 | 95 | 90 | 85 |
| III | 100 | 100 | 100 | 100 | 98 | 95 | 92 | 85 |
| II | 100 | 100 | 100 | 98 | 93 | 87 | 80 | 75 |
| IV | 100 | 100 | 100 | 95 | 90 | 85 | 82 | 78 |
| VI | 100 | 100 | 100 | 97 | 93 | 90 | 85 | 80 |
| VII | 100 | 100 | 100 | 100 | 99 | 97 | 95 | 90 |
| V | 100 | 100 | 100 | 100 | 98 | 97 | 95 | 92 |
| Comparative agent | 100 | 100 | 90 | 80 | 55 | 25 | 0 | 0 |
| Untreated | 0 | 0 | 0 | 0 | 0 | 0 | 0 | 0 |

Example 2

Loamy sandy soil was treated with compounds XXX, XXXII, XXVI, XXIX, and XXVIII, respectively, in amounts of 10, 5, 2.5 and 1.25 milligrams of active ingredient per kilogram of soil and thoroughly mixed. As comparative agent a commercial preparation on the basis of dinocap was used in the same amounts. The soil was filled in pots, and wheat of the type Heine VII was sown in the pots which were then placed in a greenhouse. 7 weeks after sowing when the plants had developed 6 leaves they were strongly infested with conidia of powdery mildew of cereals (*Erysiphe graminis*), 7 days after infestation they were examined and the efficiency of the compounds against mildew was ascertained on a percent basis.

The results summarized in Table 2 show that the compounds of the invention have a very good fungicidal action whereas the comparative agent did not exhibit any action. The mode of treatment clearly shows that the compounds of the invention were taken up by the roots and had a systemic effect.

TABLE 2

| Compound | Efficiency in percent against mildew of wheat in soil treatment with mg. of active ingredient/kg. of soil of— | | | |
|---|---|---|---|---|
| | 10 | 5 | 2.5 | 1.25 |
| XXX | 100 | 100 | 98 | 90 |
| XXXII | 100 | 100 | 95 | 90 |
| XXVI | 100 | 98 | 93 | 85 |
| XXIX | 100 | 100 | 98 | 93 |
| XXVIII | 100 | 90 | 85 | 80 |
| Comparative agent | 0 | 0 | 0 | 0 |
| Untreated | 0 | 0 | 0 | 0 |

Example 3

Plants of wheat in the three-leave stage were infested with conidia of powdery mildrew of cereals (*Erysiphe graminis*) and three days after infestation the plants were treated with preparations containing the following compounds: II, III, XII, XIII, I, IX, X, XXV, XVII, XXVI, IV, VIII, XXIX, XV, V, XXVIII, VI, VII, XXVII, in concentrations of 500, 250, 125, 60, 30, 15 and 7.5 milligrams of active ingredient per liter of spray liquor. As comparative agent commercial preparation on the basis of dinocap was used in the same concentrations. The experiment was repeated four times.

14 days after the treatment the wheat was examined as to mildew infestation. The results are summarized in Table 3.

Example 4

Plants of wheat were infested in the three-leave stage with conidia of powdery mildew of cereals (*Erysiphe graminis*) and 6 days after infestation the plants were treated with preparations containing the following compounds: II, III, XXVI, IV, VIII, XII, XXIX, XV, XIII, V, XXV, X, XVII, I, IX, XXVIII, VI, VII, XXVII, in concentrations of 500, 250, 125, 60, 30 and 15 milligrams of active ingredient per liter of spray liquor. As comparative agent a commercial preparation on the basis of dinocap was used in the same concentrations. The experiment was repeated four times.

14 days after treatment the plants were examined as to the degree of infestation. The results are summarized in Table 4.

Example 5

Plants of wheat in the two-leave stage were treated with the following compounds: II, III, XXVI, IV, VIII, VI, VII, XXVII, XII, XXIX, XV, XIII, V, I, IX, XXVIII, XXV, XVII, X, in concentrations of 4,000, 2,000, 1,000, 500 and 250 milligrams of active ingredient per liter of spray liquor. As comparative agent a commercial preparation on the basis of dinocap was used in the same concentrations. The experiment was repeated three times. After drying of the coating of active ingredient the plants were again placed in the greenhouse and, after they had developed the fifth leave, were strongly infested with conidia of mildew of cereal (*Eryspihe graminis*), and were then kept in a moist atmosphere for 24 hours. Subsequently they were brought again into the greenhouse.

After an incubation time of 14 days the plants were examined as to the infestation with *Erysiphe graminis*. The result is listed in Table 5. It can be seen that all compounds of the invention had an excellent systemic action against mildew in contrast with the comparative agent.

Example 6

Seeds of wheat were thoroughly mixed in a drum with the same compounds as used in Example 5 in amounts of 400, 200, 100, and 50 grams of active ingredient per 100 kilograms of seeds. As comparative agents a commercial treating agent on the basis of mercury and a commercial preparation on the basis of dinocap were used.

Subsequently, each time 10 treated grains were sown, in pots in five repetitions, and after development of the fifth leave the plants were strongly infested with conidia of mildew of cereals (*Erysiphe graminis*). After a time of incubation of 14 days the plants were examined as to their infestation with mildrew. The result is summarized in Table 6.

Example 7

Loamy soil was mixed for 10 minutes with the compounds indicated in Example 5 in amounts of 10, 5, 2.5 and 1.25 milligrams per kilogram of soil. As comparative agent a commercial preparation against mildew on the basis of dinocap was used in the same amounts. Pots were filled with the treated soil and 10 wheat grains were sown in each pot in four repetitions. After germination of the wheat when they had developed the fourth or fifth leave the plants were strongly infested with conidia of mildrew of cereals. 10 days after infestation the plants were examined. The result is listed in Table 7.

Example 8

Cucumber plants in the two-leave stage were strongly infested with conidia of cucumber mildew (*Erysiphe cichoracearum*) and subsequently placed in a moist atmosphere at 23° C. for 24 hours. 5 days after infestation, the plants were treated 3 times with the compounds indicated in Example 5 in amounts of 100, 50, 25, 12, 6 and 3 milligrams of active ingredient per liter of spray liquor. As comparative agent a commercial preparation on the basis of dinocap was used. After drying of the spray liquor the plants were placed in the greenhouse, and after an incubation time of 14 days, were examined as to the degree of mildew. The results are listed in Table 8.

TABLE 3

| Compound | Efficiency in percent against powdery mildew of wheat with mg. of active ingredient per liter of spray liquor of— | | | | | | |
|---|---|---|---|---|---|---|---|
| | 500 | 250 | 120 | 60 | 30 | 15 | 7.5 |
| II | 100 | 100 | 97 | 97 | 95 | 85 | 85 |
| III | 100 | 100 | 100 | 97 | 95 | 90 | 85 |
| XII | 100 | 100 | 100 | 97 | 95 | 90 | 80 |
| XIII | 100 | 100 | 100 | 95 | 90 | 85 | 85 |
| I | 100 | 100 | 98 | 95 | 90 | 85 | 80 |
| IX | 100 | 100 | 95 | 90 | 85 | 85 | 80 |
| X | 100 | 97 | 95 | 90 | 85 | 80 | 75 |
| XXV | 100 | 100 | 100 | 97 | 97 | 95 | 75 |
| XVII | 100 | 100 | 97 | 95 | 90 | 85 | 70 |
| XXVI | 100 | 97 | 97 | 90 | 85 | 75 | 40 |
| IV | 100 | 100 | 100 | 97 | 95 | 90 | 85 |
| VIII | 100 | 97 | 95 | 90 | 85 | 65 | 55 |
| XXIX | 100 | 100 | 95 | 95 | 85 | 65 | 0 |
| XV | 100 | 100 | 97 | 95 | 90 | 85 | 75 |
| V | 100 | 100 | 100 | 97 | 95 | 90 | 85 |
| XXVIII | 100 | 97 | 95 | 90 | 85 | 75 | 65 |
| VI | 100 | 100 | 97 | 95 | 95 | 85 | 75 |
| VII | 100 | 100 | 97 | 95 | 90 | 85 | 75 |
| XXVII | 100 | 100 | 97 | 95 | 90 | 90 | 85 |
| Comparative agent | 100 | 85 | 70 | 60 | 35 | 0 | 0 |
| Untreated | 0 | 0 | 0 | 0 | 0 | 0 | 0 |

TABLE 4

| Compound | Efficiency in percent against powdery mildew of wheat with mg. of active ingredient per liter of spray liquor of— | | | | | |
|---|---|---|---|---|---|---|
| | 500 | 250 | 120 | 66 | 30 | 15 |
| II | 97 | 95 | 90 | 85 | 65 | 40 |
| III | 100 | 97 | 97 | 95 | 90 | 65 |
| XXVI | 97 | 95 | 90 | 85 | 65 | 40 |
| IV | 97 | 95 | 90 | 85 | 65 | 40 |
| VIII | 97 | 95 | 90 | 85 | 75 | 40 |
| XII | 100 | 97 | 95 | 85 | 65 | 0 |
| XXIX | 100 | 97 | 97 | 90 | 90 | 75 |
| XV | 100 | 97 | 95 | 85 | 65 | 0 |
| XIII | 100 | 100 | 97 | 95 | 90 | 65 |
| V | 100 | 97 | 95 | 90 | 75 | 65 |
| XXV | 100 | 100 | 100 | 97 | 95 | 90 |
| X | 100 | 97 | 90 | 75 | 65 | 0 |
| XVII | 100 | 97 | 95 | 85 | 75 | 65 |
| I | 100 | 97 | 95 | 90 | 75 | 0 |
| IX | 97 | 95 | 85 | 75 | 65 | 0 |
| XXVIII | 97 | 97 | 95 | 90 | 65 | 40 |
| VI | 97 | 95 | 90 | 85 | 65 | 40 |
| VII | 97 | 95 | 90 | 90 | 75 | 40 |
| XXVII | 100 | 97 | 95 | 90 | 90 | 85 |
| Comparative agent | 85 | 70 | 55 | 30 | 0 | 0 |
| Untreated | 0 | 0 | 0 | 0 | 0 | 0 |

TABLE 5

| Compound | Efficiency in percent against powdery mildew of wheat with mg. of active ingredient per liter of spray liquor of— | | | | |
|---|---|---|---|---|---|
| | 4,000 | 2,000 | 1,000 | 500 | 250 |
| II | 100 | 97 | 95 | 90 | 65 |
| III | 100 | 97 | 95 | 90 | 75 |
| XXVI | 97 | 95 | 85 | 75 | 65 |
| IV | 100 | 97 | 95 | 90 | 65 |
| VIII | 100 | 97 | 95 | 90 | 65 |
| VI | 100 | 95 | 90 | 85 | 65 |
| VII | 100 | 95 | 90 | 75 | 40 |
| XXVII | 100 | 95 | 90 | 85 | 65 |
| XII | 100 | 100 | 97 | 95 | 90 |
| XXIX | 100 | 97 | 97 | 95 | 85 |
| XV | 100 | 97 | 90 | 85 | 65 |
| XIII | 100 | 100 | 97 | 97 | 90 |
| V | 100 | 97 | 90 | 85 | 65 |
| I | 100 | 97 | 95 | 90 | 85 |
| IX | 100 | 97 | 95 | 85 | 65 |
| XXVIII | 100 | 95 | 90 | 85 | 65 |
| XXV | 100 | 100 | 97 | 90 | 85 |
| XVII | 100 | 100 | 97 | 97 | 90 |
| X | 100 | 100 | 97 | 95 | 90 |
| Comparative agent | 0 | 0 | 0 | 0 | 0 |
| Untreated | 0 | 0 | 0 | 0 | 0 |

TABLE 6

| Compound | Efficiency in percent against mildew in wheat after seed treatment with grams of active ingredient per 100 kg. of seed of— | | | |
|---|---|---|---|---|
| | 400 | 200 | 100 | 50 |
| II | 100 | 95 | 85 | 40 |
| III | 97 | 90 | 85 | 65 |
| XXVI | 85 | 75 | 65 | 0 |
| IV | 100 | 95 | 90 | 65 |
| VIII | 97 | 95 | 90 | 75 |
| VI | 100 | 97 | 90 | 40 |
| VII | 98 | 97 | 90 | 65 |
| XXVII | 95 | 90 | 75 | 0 |
| XII | 100 | 95 | 90 | 85 |
| XXIX | 100 | 95 | 85 | 75 |
| XV | 97 | 95 | 85 | 75 |
| XIII | 100 | 97 | 95 | 90 |
| V | 97 | 95 | 85 | 0 |
| I | 97 | 95 | 90 | 85 |
| IX | 95 | 90 | 85 | 75 |
| XXVIII | 95 | 90 | 75 | 0 |
| XXV | 97 | 95 | 90 | 75 |
| XVII | 100 | 100 | 97 | 85 |
| X | 97 | 95 | 85 | 75 |
| Comparative agent | 0 | 0 | 0 | 0 |
| Comparative agent | 0 | 0 | 0 | 0 |
| Untreated | 0 | 0 | 0 | 0 |

TABLE 7

| Compound | Efficiency in percent against mildew in wheat in soil treatment with mg. of active ingredient per kg. of soil of— | | | |
|---|---|---|---|---|
| | 10 | 5 | 2.5 | 1.25 |
| II | 100 | 97 | 95 | 85 |
| III | 100 | 97 | 95 | 85 |
| XXVI | 100 | 97 | 95 | 65 |
| IV | 100 | 97 | 90 | 85 |
| VIII | 95 | 90 | 85 | 75 |
| VI | 100 | 97 | 97 | 90 |
| VII | 100 | 100 | 95 | 85 |
| XXVII | 100 | 97 | 90 | 65 |
| XII | 100 | 97 | 95 | 95 |
| XXIX | 100 | 97 | 90 | 65 |
| XV | 100 | 97 | 90 | 75 |
| XIII | 100 | 100 | 97 | 85 |
| V | 100 | 97 | 95 | 85 |
| I | 100 | 97 | 95 | 75 |
| IX | 100 | 97 | 95 | 75 |
| XXVIII | 97 | 95 | 85 | 75 |
| XXV | 100 | 97 | 97 | 90 |
| XVII | 100 | 97 | 97 | 95 |
| X | 100 | 97 | 95 | 85 |
| Comparative agent | 0 | 0 | 0 | 0 |
| Untreated | 0 | 0 | 0 | 0 |

TABLE 8

| Compound | Efficiency in percent against cucumber mildew with mg. of active ingredient per liter of spray liquor of— | | | | | |
|---|---|---|---|---|---|---|
| | 100 | 50 | 25 | 12 | 6 | 3 |
| II | 100 | 97 | 97 | 95 | 90 | 85 |
| III | 100 | 100 | 97 | 97 | 90 | 85 |
| XXVI | 100 | 97 | 97 | 90 | 85 | 65 |
| IV | 100 | 100 | 97 | 90 | 85 | 65 |
| VIII | 100 | 100 | 97 | 95 | 85 | 75 |
| VI | 100 | 97 | 95 | 90 | 85 | 65 |
| VII | 100 | 100 | 100 | 97 | 95 | 85 |
| XXVII | 100 | 97 | 95 | 90 | 65 | 0 |
| XII | 100 | 100 | 100 | 97 | 95 | 85 |
| XXIX | 100 | 100 | 97 | 95 | 90 | 85 |
| XV | 100 | 100 | 97 | 97 | 95 | 85 |
| XIII | 100 | 100 | 100 | 100 | 95 | 85 |
| V | 100 | 100 | 97 | 95 | 90 | 65 |
| I | 100 | 100 | 97 | 95 | 90 | 80 |
| IX | 100 | 100 | 97 | 95 | 90 | 80 |
| XXVIII | 100 | 97 | 90 | 75 | 40 | 0 |
| XXV | 100 | 100 | 100 | 97 | 95 | 90 |
| XVII | 100 | 100 | 100 | 97 | 95 | 90 |
| X | 100 | 100 | 97 | 95 | 90 | 80 |
| Comparative agent | 100 | 90 | 75 | 60 | 30 | 0 |
| Untreated | 0 | 0 | 0 | 0 | 0 | 0 |

TABLE 9

| Compound | Efficiency against cucumber mildew in percent with mg. of active ingredient per liter of spray liquor of— | | | |
|---|---|---|---|---|
| | 1,000 | 500 | 250 | 125 |
| II | 90 | 85 | 75 | 65 |
| III | 97 | 95 | 85 | 75 |
| XXVI | 75 | 40 | 0 | 0 |
| IV | 97 | 95 | 85 | 65 |
| VIII | 75 | 65 | 0 | 0 |
| VI | 90 | 85 | 75 | 65 |
| VII | 97 | 95 | 90 | 85 |
| XXVII | 85 | 75 | 40 | 0 |
| XII | 97 | 95 | 75 | 60 |
| XXIX | 75 | 65 | 0 | 0 |
| XV | 100 | 95 | 75 | 60 |
| XIII | 100 | 95 | 85 | 70 |
| V | 75 | 65 | 40 | 0 |
| I | 97 | 90 | 75 | 60 |
| IX | 97 | 95 | 75 | 65 |
| XXVIII | 90 | 85 | 75 | 40 |
| XXV | 97 | 95 | 85 | 65 |
| XVII | 100 | 97 | 90 | 75 |
| X | 97 | 85 | 65 | 0 |
| Comparative agent | 0 | 0 | 0 | 0 |
| Untreated | 0 | 0 | 0 | 0 |

TABLE 10

| Compound | Efficiency in percent against cucumber mildew with mg. of active ingredient per liter of spray liquor of— | | | |
|---|---|---|---|---|
| | 200 | 100 | 50 | 25 |
| II | 85 | 65 | 0 | 0 |
| III | 95 | 85 | 65 | 0 |
| XXVI | 65 | 40 | 0 | 0 |
| IV | 95 | 85 | 65 | 0 |
| VIII | 95 | 90 | 75 | 65 |
| VI | 90 | 75 | 65 | 0 |
| VII | 90 | 85 | 65 | 0 |
| XXVII | 85 | 75 | 65 | 0 |
| XII | 95 | 90 | 85 | 75 |
| XXIX | 75 | 65 | 0 | 0 |
| XV | 97 | 90 | 75 | 40 |
| XIII | 97 | 95 | 90 | 85 |
| V | 95 | 90 | 65 | 0 |
| I | 97 | 95 | 90 | 75 |
| IX | 90 | 85 | 75 | 75 |
| XXVIII | 75 | 65 | 40 | 0 |
| XXV | 100 | 97 | 90 | 75 |
| XVII | 100 | 97 | 95 | 90 |
| X | 90 | 85 | 75 | 65 |
| Comparative agent | 0 | 0 | 0 | 0 |
| Untreated | 0 | 0 | 0 | 0 |

Example 9

Cucumber plants in the two-leave stage were treated with the compounds indicated in Example 5 in amounts of 1000, 500, 250 and 125 milligrams per liter of spray liquor. After drying of the coating, the plants were brought into a greenhouse. After the plants thus treated had developed the fifth or sixth leave they were strongly infested with conidia of cucumber mildew (*Erysiphe cichoracearum*), kept in a moist atmosphere and, after 24 hours were brought again into the greenhouse. After an incubation time of 14 days the plants were examined as to the degree of mildew. The result is listed in Table 9.

Example 10

Plants of cucumbers having 2 leaves were treated on the lower side of the leaves only with the compounds indicated in Example 5, while care was taken that no active ingredient came into contact with the upper sides. The compounds were used in amounts of 200, 100, 50 and 25 milligrams of active ingredient per liter of spray liquor. As comparative agent a commercial preparation on the basis of dinocap was used in the same concentration.

After drying of the coating the untreated upper sides of the leaves were cautiously infested with conidia of cucumber mildew and the plants were placed in a moist atmosphere. After 24 hours the plants were brought into the greenhouse and 14 days later they were examined as to the degree of infestation with mildew. The result is listed in Table 10.

Example 11

Loamy soil was thoroughly mixed for 10 minutes with the compounds indicated in Example 5 in amounts of 10, 5, 2.5 and 1.25 milligrams per kilogram of soil. As comparative agent a commercial preparation on the basis of dinocap was used. Pots were filled with the treated soil, cucumber seeds were sown in the pots in 5 repetitions and the pots were placed in a greenhouse. After the cucumber plants had developed their fifth leave they were strongly infested with conidia of cucumber mildew, kept for 24 hours in a moist atmosphere and brought again into the greenhouse. After a time of incubation of 14 days, the cucumber plants were examined as to the degree of infestation with mildew. The result is summarized in Table 11.

Example 12

Cucumber seeds were thoroughly mixed for 10 minutes in a drum with the compounds indicated in Example 5 in amounts of 400, 200, 100 and 50 grams of active ingredient per 100 kilograms of seeds. As comparative agent two commercial preparations, one on the basis of mercury and the other on the basis of dinocap, were used in the same amounts, but calculated on the preparations. The treated seeds were sown in pots in 5 repetitions. When the plants had developed their fifth leaf they were strongly infested with conidia of cucumber mildew and placed at once in a moist atmosphere of 23° C. After a residence time of 24 hours the plants were brought into a greenhouse where they were examined after 14 days as to the degree of infestation with mildew. The result is indicated in Table 12.

TABLE 11

Efficiency in percent against cucumber mildew in soil treatment with mg. of active ingredient per kg. of soil of—

| Compound | 10 | 5 | 2.5 | 1.25 |
|---|---|---|---|---|
| II | 100 | 100 | 97 | 75 |
| III | 100 | 100 | 97 | 75 |
| XXVI | 100 | 100 | 97 | 85 |
| IV | 100 | 100 | 97 | 95 |
| VIII | 100 | 100 | 97 | 90 |
| VI | 100 | 97 | 95 | 75 |
| VII | 100 | 100 | 97 | 85 |
| XXVII | 100 | 100 | 95 | 75 |
| XII | 100 | 100 | 97 | 95 |
| XXIX | 100 | 100 | 97 | 97 |
| XV | 100 | 97 | 95 | 85 |
| XIII | 100 | 100 | 100 | 95 |
| V | 100 | 100 | 95 | 75 |
| I | 100 | 100 | 97 | 90 |
| IX | 100 | 100 | 97 | 90 |
| XXVIII | 100 | 97 | 95 | 85 |
| XXV | 100 | 100 | 97 | 97 |
| XVII | 100 | 100 | 97 | 95 |
| X | 100 | 100 | 97 | 85 |
| Comparative agent | 0 | 0 | 0 | 0 |
| Untreated | 0 | 0 | 0 | 0 |

TABLE 12

Efficiency against cucumber mildew in per cent in seed treatment with mg. of active ingredient per 100 kg. of seeds of—

| Compound | 400 | 200 | 100 | 50 |
|---|---|---|---|---|
| II | 100 | 97 | 95 | 85 |
| III | 100 | 97 | 90 | 85 |
| XXVI | 95 | 85 | 75 | 65 |
| IV | 100 | 97 | 90 | 85 |
| VIII | 100 | 97 | 90 | 75 |
| VI | 97 | 97 | 90 | 85 |
| VII | 97 | 95 | 90 | 75 |
| XXVII | 97 | 95 | 90 | 40 |
| XII | 97 | 95 | 90 | 70 |
| XXIX | 97 | 95 | 90 | 85 |
| XV | 95 | 90 | 85 | 80 |
| XIII | 100 | 95 | 90 | 75 |
| V | 97 | 95 | 90 | 75 |
| I | 97 | 95 | 85 | 65 |
| IX | 97 | 95 | 90 | 75 |
| XXVIII | 97 | 95 | 75 | 65 |
| XXV | 100 | 97 | 90 | 75 |
| XVII | 95 | 90 | 80 | 70 |
| X | 97 | 95 | 90 | 75 |
| Comparative agent | 0 | 0 | 0 | 0 |
| Comparative agent | 0 | 0 | 0 | 0 |
| Untreated | 0 | 0 | 0 | 0 |

Example 13

Sugar beet plants were treated with the compounds indicated in Example 5 in amounts of 25, 12.5, 6 and 3 milligrams of active ingredient per liter of spray liquor. As comparative agents commercial preparations on the basis of copper oxichloride and on the basis of maneb (manganese (ethylene-bis-dithiocarbamate)) were used. After drying of the coating, the plants were strongly infested with spores of *Cercospora beticola* and then placed in a moist atmosphere of 25° C. After a residence time of 24 hours, the plants were brought into the greenhouse and examined after an incubation time of 21 days as to the degree of infestation with *Cercospora beticola*. The result is listed in Table 13.

Example 14

Sugar beet plants were strongly infested with spores of *Cercospora beticola* and placed at once in a moist atmosphere of 25° C. After 24 hours the plants were transferred into the greenhouse. 6 days after infestation the plants were treated with the compounds indicated in Example 5 in concentrations of 250, 120, 60 and 30 milligrams of active ingredient per liter of spray liquor. As comparative agents preparations on the basis of copper oxichloride and maneb were used. After drying of the coating of active ingredient the plants were placed again in the greenhouse where they were examined after an incubation time of 21 days as to their degree of infestation with *Cercospora beticola*. The result is indicated in Table 14.

TABLE 13

Efficiency in percent against *Cercospora beticola* in sugar beet with mg. of active ingredient per liter of spray liquor of—

| Compound | 25 | 12 | 6 | 3 | 1.5 |
|---|---|---|---|---|---|
| II | 100 | 100 | 97 | 90 | 80 |
| III | 100 | 100 | 97 | 95 | 80 |
| XXVI | 100 | 97 | 95 | 90 | 75 |
| IV | 100 | 97 | 95 | 90 | 70 |
| VIII | 100 | 97 | 95 | 90 | 85 |
| VI | 100 | 97 | 95 | 85 | 75 |
| VII | 100 | 97 | 95 | 85 | 70 |
| XXVII | 100 | 100 | 97 | 90 | 85 |
| XII | 100 | 100 | 97 | 97 | 90 |
| XXIX | 100 | 100 | 97 | 97 | 90 |
| XV | 100 | 97 | 95 | 95 | 90 |
| XIII | 100 | 100 | 100 | 97 | 90 |
| V | 100 | 97 | 95 | 90 | 80 |
| I | 100 | 97 | 97 | 95 | 90 |
| IX | 100 | 97 | 97 | 95 | 90 |
| XXVIII | 100 | 100 | 97 | 95 | 85 |
| XXV | 100 | 100 | 100 | 97 | 90 |
| XVII | 100 | 100 | 100 | 97 | 90 |
| X | 100 | 97 | 95 | 95 | 90 |
| Comparative agent, copper oxichloride | 75 | 38 | 0 | 0 | 0 |
| Comparative agent, maneb | 90 | 65 | 40 | 25 | 0 |
| Untreated | 0 | 0 | 0 | 0 | 0 |

TABLE 14

Efficiency in percent against *Cercospora beticola* in sugar beet with mg. of active ingredient per liter of spray liquor

| Compound | 250 | 120 | 60 | 30 |
|---|---|---|---|---|
| II | 100 | 97 | 95 | 85 |
| III | 100 | 100 | 97 | 95 |
| XXVI | 100 | 97 | 95 | 90 |
| IV | 100 | 97 | 95 | 90 |
| VIII | 100 | 95 | 85 | 65 |
| VI | 100 | 97 | 95 | 85 |
| VII | 100 | 97 | 95 | 75 |
| XXIX | 100 | 97 | 90 | 85 |
| XV | 100 | 97 | 95 | 85 |
| XXVII | 100 | 97 | 95 | 85 |
| XII | 100 | 97 | 95 | 85 |
| XIII | 100 | 100 | 97 | 95 |
| V | 100 | 97 | 85 | 65 |
| I | 100 | 97 | 95 | 85 |
| IX | 97 | 95 | 90 | 85 |
| XXVIII | 100 | 97 | 95 | 85 |
| XXV | 100 | 100 | 97 | 95 |
| XVII | 100 | 100 | 97 | 95 |
| X | 100 | 97 | 95 | 85 |
| Comparative agent, copper oxichloride | 45 | 20 | 0 | 0 |
| Comparative agent, maneb | 60 | 30 | 0 | 0 |
| Untreated | 0 | 0 | 0 | 0 |

Example 15

Apple seedlings in the 4-leave stage were artificially infested in the usual manner with conidia of apply mildew (*Podosphaera leucotricha*) and 5 days after infestation the seedlings were treated with the following compounds: II, III, XXVI, IV, VIII, VI, VII, XXVII, XII, XXIX, XV, XIII, V, I, IX, XXVIII, XXV, XVII, X, XXX, XXXI, XXXII, in concentrations of 50, 25, 12, 6 and 3 milligrams of active ingredient per liter of spray liquor. As comparative agent a commercial preparation on the basis of binapacryl (2-sek-butyl - 4,6 - dinitrophenyl-3-methyl-butenoate) was used with the same concentration of active ingredient. The experiment was repeated 4 times.

After an incubation time of 14 days the plants were examined as to the degree of infestation with apple mildew. The result is indicated in Table 15.

Example 16

Tomato plants of the type "Rheinlands Ruhm" in the grown-up three leave stage were treated with the compounds indicated in Example 15 in concentrations of 100, 50, 25, 12 and 6 milligrams of active ingredient per liter of spray liquor. As comparative agent maneb was used in the same concentrations.

One day after drying of the coating the plants were strongly infested with spores of leaf mould of tomatoes (*Cladosporium fulvum*), placed in a moist atmosphere and, after 24 hours, brought into a greenhouse, 3 weeks after infestation the plants were examined. The result is summarized in Table 16.

TABLE 15

| Compound | Efficiency in percent against apple mildew with mg. of active ingredient per liter of spray liquor of— | | | | |
|---|---|---|---|---|---|
| | 50 | 25 | 12 | 6 | 3 |
| II | 100 | 100 | 97 | 97 | 95 |
| III | 100 | 100 | 100 | 97 | 95 |
| XXVI | 97 | 90 | 85 | 40 | 30 |
| IV | 100 | 100 | 100 | 97 | 95 |
| VIII | 95 | 90 | 75 | 60 | 40 |
| VI | 100 | 100 | 97 | 97 | 95 |
| VII | 100 | 100 | 100 | 97 | 95 |
| XXVII | 100 | 100 | 97 | 95 | 90 |
| XII | 100 | 97 | 95 | 90 | 85 |
| XXIX | 100 | 100 | 97 | 90 | 65 |
| XV | 100 | 100 | 97 | 95 | 90 |
| XIII | 100 | 100 | 100 | 97 | 95 |
| V | 100 | 100 | 100 | 97 | 90 |
| I | 100 | 100 | 100 | 95 | 90 |
| IX | 100 | 97 | 95 | 90 | 85 |
| XXVIII | 97 | 95 | 90 | 85 | 75 |
| XXV | 100 | 100 | 100 | 97 | 97 |
| XVII | 100 | 100 | 97 | 97 | 95 |
| X | 97 | 95 | 90 | 85 | 70 |
| XXX | 100 | 100 | 100 | 97 | 95 |
| XXXI | 100 | 97 | 95 | 90 | 95 |
| XXXII | 100 | 100 | 100 | 97 | 97 |
| Comparative agent | 90 | 85 | 60 | 40 | 0 |
| Untreated | 0 | 0 | 0 | 0 | 0 |

TABLE 16

| Compound | Efficiency in percent against *Cladosporium fulvum* on tomato plants with mg of active ingredient per liter of spray liquor of— | | | | |
|---|---|---|---|---|---|
| | 100 | 50 | 25 | 12 | 6 |
| II | 100 | 100 | 97 | 95 | 90 |
| III | 100 | 100 | 97 | 95 | 90 |
| XXVI | 100 | 97 | 97 | 95 | 85 |
| IV | 100 | 100 | 97 | 95 | 90 |
| VIII | 100 | 100 | 90 | 85 | 80 |
| VI | 100 | 100 | 97 | 90 | 75 |
| VII | 100 | 100 | 97 | 90 | 90 |
| XXVII | 100 | 100 | 97 | 95 | 85 |
| XII | 100 | 95 | 90 | 75 | 70 |
| XXIX | 100 | 100 | 97 | 97 | 90 |
| XV | 100 | 100 | 95 | 90 | 75 |
| XIII | 100 | 97 | 90 | 85 | 75 |
| V | 100 | 100 | 97 | 95 | 85 |
| I | 100 | 100 | 95 | 90 | 85 |
| IX | 100 | 95 | 95 | 90 | 80 |
| XXVIII | 100 | 100 | 97 | 90 | 85 |
| XXV | 100 | 100 | 100 | 95 | 95 |
| XVII | 100 | 100 | 95 | 90 | 75 |
| X | 100 | 90 | 85 | 75 | 70 |
| XXX | 100 | 100 | 100 | 95 | 85 |
| XXXI | 100 | 100 | 95 | 90 | 80 |
| XXXII | 100 | 100 | 100 | 97 | 95 |
| Comparative agent | 95 | 70 | 50 | 25 | 0 |
| Untreated | 0 | 0 | 0 | 0 | 0 |

Example 17

Tomato plants of the type "Rheinlands Ruhm" in the grown up three-leave stage were strongly infested with conidia of *Cladosporium fulvum*, kept for 24 hours in a moist atmosphere and then placed in a greenhouse. 5 days after infestation the plants were treated with the compounds indicated in Example 15 and, after drying of the spray liquor, were again brought into the greenhouse. The active ingredients were used in concentrations of 250, 120, 60, 30, and 15 milligrams per liter of spray liquor. As comparative agent a commercial preparation on the basis of zineb (zinc ethylene bisdithiocarbamate) was used in the same concentration of active ingredient.

3 weeks after treatment the plants were examined as to the degree of infestation with *Cladosporium fulvum*. The result is summarized in Table 17.

Example 18

Celery plants of the type "Magdeburger Markt" were treated in the four-leave stage with the compounds indicated in Example 15 in concentrations of 500, 250, 120, and 60 milligrams of active ingredient per liter of spray liquor. As comparative agents commercial preparations on the basis of copper oxichloride and on the basis of maneb were used in the same concentrations.

One day after drying of the spray liquor the plants were strongly infested in the usual manner with spores of *Septoria apii*, placed for 24 hours in a moist atmosphere of 25° C. and then brought into a greenhouse. 3 weeks after infestation the plants were examined. The result is indicated in Table 18.

TABLE 17

| Compound | Efficiency in percent against *Cladosporium fulvum* on tomato plants with mg. of active ingredient per liter of spray liquor of— | | | | |
|---|---|---|---|---|---|
| | 250 | 120 | 60 | 30 | 15 |
| II | 97 | 95 | 85 | 65 | 40 |
| III | 100 | 97 | 90 | 85 | 75 |
| XXVI | 97 | 90 | 85 | 70 | 60 |
| IV | 100 | 97 | 95 | 90 | 85 |
| VIII | 97 | 95 | 90 | 85 | 70 |
| VI | 100 | 97 | 95 | 85 | 75 |
| VII | 97 | 95 | 90 | 85 | 75 |
| XXVII | 100 | 97 | 95 | 90 | 85 |
| XII | 100 | 97 | 95 | 75 | 70 |
| XXIX | 95 | 90 | 85 | 70 | 65 |
| XV | 100 | 95 | 90 | 85 | 80 |
| XIII | 100 | 100 | 97 | 95 | 90 |
| V | 100 | 97 | 97 | 95 | 90 |
| I | 100 | 97 | 90 | 85 | 75 |
| IX | 97 | 95 | 90 | 85 | 60 |
| XXVIII | 100 | 97 | 95 | 90 | 85 |
| XXV | 100 | 100 | 97 | 95 | 95 |
| XVII | 100 | 100 | 97 | 95 | 90 |
| X | 100 | 97 | 95 | 85 | 75 |
| XXX | 100 | 100 | 97 | 90 | 85 |
| XXXI | 97 | 90 | 85 | 75 | 65 |
| XXXII | 100 | 100 | 97 | 90 | 85 |
| Comparative agent | 70 | 30 | 0 | 0 | 0 |
| Untreated | 0 | 0 | 0 | 0 | 0 |

TABLE 18

| Compound | Efficiency in percent against *Septorial apii* on celery with mg. of active ingredient per liter of spray liquor of— | | | |
|---|---|---|---|---|
| | 500 | 250 | 120 | 60 |
| II | 100 | 97 | 90 | 85 |
| III | 100 | 97 | 90 | 85 |
| XXVI | 97 | 90 | 85 | 65 |
| IV | 100 | 97 | 95 | 90 |
| VIII | 100 | 95 | 90 | 80 |
| VI | 97 | 95 | 90 | 85 |
| VII | 100 | 97 | 90 | 85 |
| XXVII | 97 | 95 | 90 | 75 |
| XII | 100 | 97 | 95 | 90 |
| XXIX | 100 | 97 | 95 | 85 |
| XV | 100 | 97 | 95 | 90 |
| XIII | 100 | 97 | 95 | 90 |
| V | 100 | 97 | 90 | 80 |
| I | 100 | 97 | 95 | 90 |
| IX | 100 | 97 | 95 | 90 |
| XXVIII | 97 | 95 | 85 | 75 |
| XXV | 100 | 97 | 95 | 90 |
| XVII | 100 | 100 | 97 | 95 |
| X | 100 | 97 | 95 | 90 |
| XXX | 100 | 97 | 95 | 85 |
| XXXI | 100 | 97 | 95 | 90 |
| XXXII | 100 | 97 | 95 | 95 |
| Comparative agent, maneb | 70 | 45 | 20 | 0 |
| Comparative agent, copper oxichloride | 85 | 60 | 30 | 0 |
| Untreated | 0 | 0 | 0 | 0 |

Example 19

Rice plants in the three-leave stage were treated with the compounds of the invention indicated in Example 15 in concentrations of 500, 250, 120, 60, and 30 milligrams per liter of spray liquor. As comparative agent a commercial preparation on the basis of maneb was used in the same concentrations. After drying of the spray liquor, the plants were strongly infested with spores of *Piricularia oryzae*, placed in a moist atmosphere of 25° C. and then brought into a greenhouse. Two weeks after infestation, the plants were examined as to the degree of disease. The result is summarized in Table 19.

Example 20

Kidney beans were thoroughly mixed for 10 minutes in a drum with the following compounds of the invention in concentrations of 200, 100, 50, 25, and 12.5 grams of active ingredient per 100 kilograms of beans: II, III, XXVI, IV, VIII, VI, VII, XXVII, XII, XXIX, XV, XIII, V, I, IX, XXVIII, XXV, XVII, X, XXX, XXXI, XXXII, XIX, XVI, XIV. As comparative agent a preparation on the basis of pentachloronitrobenzene was used in the same concentrations. The experiment was repeated 4 times. One day after the treatment equal numbers of beans were sown in pots in a soil strongly infested with *Rhizoctonia solani* and the pots were placed in the greenhouse.

3 weeks after germination the healthy plants were counted. The result is indicated in Table 20.

TABLE 19

| Compound | Efficiency in percent against *Piricularia oryzae* on rice with mg. of active ingredient per liter of spray liquor of— | | | | |
|---|---|---|---|---|---|
| | 500 | 250 | 120 | 60 | 30 |
| II | 100 | 95 | 90 | 65 | 50 |
| III | 100 | 95 | 90 | 65 | 50 |
| XXVI | 100 | 95 | 90 | 85 | 75 |
| IV | 100 | 100 | 97 | 95 | 85 |
| VIII | 95 | 90 | 85 | 70 | 65 |
| VI | 100 | 97 | 95 | 90 | 85 |
| VII | 100 | 97 | 95 | 90 | 85 |
| XXVII | 95 | 90 | 75 | 65 | 50 |
| XII | 95 | 90 | 70 | 65 | 55 |
| XXIX | 95 | 90 | 80 | 70 | 65 |
| XV | 100 | 97 | 90 | 85 | 75 |
| XIII | 100 | 97 | 95 | 90 | 80 |
| V | 100 | 100 | 97 | 95 | 90 |
| I | 97 | 90 | 85 | 70 | 65 |
| IX | 95 | 85 | 75 | 65 | 50 |
| XXVIII | 95 | 85 | 80 | 70 | 60 |
| XXV | 100 | 100 | 97 | 95 | 90 |
| XVII | 100 | 97 | 90 | 85 | 65 |
| X | 95 | 90 | 85 | 65 | 50 |
| XXX | 100 | 100 | 97 | 90 | 85 |
| XXXI | 97 | 90 | 85 | 70 | 65 |
| XXXII | 100 | 97 | 95 | 90 | 85 |
| Comparative agent | 70 | 45 | 0 | 0 | 0 |
| Untreated | 0 | 0 | 0 | 0 | 0 |

TABLE 20

| Compound | Efficiency in percent against *Rhizoctonia solani* in dwarf beans after seed treatment with g. of active ingredient per 100 kg. of seed of— | | | | |
|---|---|---|---|---|---|
| | 200 | 100 | 50 | 25 | 12.5 |
| II | 100 | 90 | 90 | 80 | 70 |
| III | 100 | 100 | 95 | 90 | 80 |
| XXVI | 100 | 100 | 100 | 90 | 80 |
| IV | 100 | 100 | 90 | 80 | 70 |
| VIII | 100 | 90 | 80 | 70 | 65 |
| VI | 100 | 100 | 95 | 90 | 80 |
| VII | 100 | 95 | 90 | 80 | 75 |
| XXVII | 100 | 100 | 100 | 90 | 85 |
| XII | 100 | 95 | 90 | 85 | 70 |
| XXIX | 100 | 100 | 95 | 90 | 85 |
| XV | 100 | 90 | 85 | 75 | 70 |
| XIII | 100 | 100 | 90 | 80 | 70 |
| V | 100 | 90 | 85 | 80 | 70 |
| I | 100 | 95 | 90 | 80 | 75 |
| IX | 100 | 95 | 80 | 75 | 60 |
| XXVIII | 100 | 90 | 85 | 70 | 65 |
| XXV | 100 | 100 | 100 | 95 | 90 |
| XVII | 100 | 90 | 85 | 70 | 65 |
| X | 100 | 90 | 85 | 70 | 65 |
| XXX | 100 | 100 | 90 | 85 | 75 |
| XXXI | 100 | 90 | 85 | 70 | 65 |
| XXXII | 100 | 100 | 100 | 95 | 80 |
| XIX | 100 | 95 | 90 | 85 | 75 |
| XVI | 100 | 95 | 85 | 70 | 65 |
| XIV | 100 | 90 | 80 | 65 | 60 |
| Comparative agent | 90 | 60 | 45 | 30 | 0 |
| Untreated | 0 | 0 | 0 | 0 | 0 |

Example 21

A wettable powder containing 1-(2'-chloro-4'-bromo-phenoxysulfonylcarbamoyl) - 2 - carbomethoxy-aminobenzimidazole(I) as active ingredient was prepared by mixing 20% by weight of active ingredient
13% by weight of highly disperse silicic acid (Silcasil® Z)
49% by weight of magnesium-aluminum silicate (Sillitin® Z)
10% by weight of sulfite waste liquor
1% by weight of oleic acid methyl tauride (Hostapon® T)
7% by weight of wetting agent Preparations of the other compounds were made in an analogous manner.

Example 22

Albino rats were orally infested each with 1,000 eggs of *Heterakis spumosa*. After termination of the prepatent period (about 7 weeks), the active ingredients were administered once p.o. or s.c. The results were evaluated one week after administration. For this purpose the animals were killed, dissected and the living and dead parasites were counted.

The results are summarized in the following Table 21.

TABLE 21

| Compound | Administration against *Heterakis spumosa* with mg. of active ingredient per kg. of body weight s.c. and p.o. | Efficiency, percent of dead parasites | Tolerated maximum dose in mg./kg. of mouse (s.c. and p.o.) |
|---|---|---|---|
| XXV | 1 x 200 s.c. | 100 | 800 s.c. |
| | 1 x 200 p.o. | 100 | 800 p.o. |
| XLIII | 1 x <1,000 s.c. | 100 | 800 s.c. |
| | 1 x 1,000 p.o. | 100 | 1,600 p.o. |
| XXX | 1 x 100 s.c. | 100 | 200 s.c. |
| | 1 x 150 p.o. | 100 | 200 p.o. |
| XLI | 1 x 300 s.c. | 100 | 400 s.c. |
| | 1 x 600 p.o. | 100 | 1,600 p.o. |
| XLII | 1 x 300 s.c. | 100 | 400 s.c. |
| | 1 x 200 p.o. | 100 | 800 p.o. |
| XLIV | 1 x 150 s.c. | 100 | 200 s.c. |
| | 1 x 400 p.o. | 100 | 800 p.o. |
| XXXIV | 1 x 300 s.c. | 100 | 400 s.c. |
| | 1 x 600 p.o. | 100 | 800 p.o. |

We claim:

1. Benzimidazole of the formula

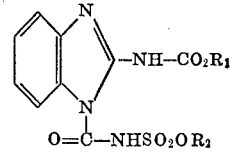

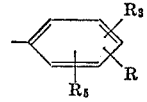

in which $R_1$ is alkyl of 1 to 4 carbon atoms, $R_2$ is alkyl of 1 to 4 carbon atoms or alkyl of 1 to 4 carbon atoms substituted by halogen or by alkoxy of 1 to 4 carbon atoms, or a radical of the formula in which $R_3$, $R_4$ and $R_5$ are hydrogen, n-alkyl of 1 to 6 carbon atoms or halogen, or one of $R_3$, $R_4$ and $R_5$ is branched alkyl of 3 to 6 carbon atoms, alkoxy of 1 to 4 carbon atoms; alkoxycarbonyl of 1 to 4 carbon atoms in the alkoxy group, cyano, nitro, trifluoromethyl or phenyl when the others are hydrogen.

2. 1-(2',4'-dichlorophenoxysulfonyl - carbamoyl) - 2-carbomethoxy-aminobenzimidazole.

3. 1-(3'-chlorophenoxysulfonylcarbamoyl) - 2 - carbomethoxy-aminobenzimidazole.

4. 1-(2',4',6'-trichlorophenoxysulfonylcarbamoyl) - 2-carbomethoxy-aminobenzimidazole.

5. 1-(2',2',2' - trichloroethoxysulfonylcarbamoyl) - 2-carbomethoxy-aminobenzimidazole.

6. 1-(2'-chlorophenoxysulfonylcarbamoyl) - 2 - carbomethoxy-aminobenzimidazole.

7. 1-(2',4',5'-trichlorophenoxysulfonylcarbamoyl) - 2-carbomethoxy-aminobenzimidazole.

8. 1-(3',4'-dichlorophenoxysulfonylcarbamoyl)-2-carbomethoxy-aminobenzimidazole.

9. 1-(2',5'-dichlorophenoxysulfonylcarbamoyl)-2-carbomethoxy-aminobenzimidazole.

10. 1-(1',3'-dichloropropoxy-(2')-sulfonylcarbamoyl)-2-carbomethoxy-aminobenzimidazole.

References Cited

UNITED STATES PATENTS

| | | | |
|---|---|---|---|
| 3,626,070 | 12/1971 | Soboczenski | 260—309.2 |
| 3,541,213 | 11/1970 | Klopping | 260—309.2 |
| 3,660,421 | 5/1972 | Osieka et al. | 260—309.2 |
| 3,662,069 | 5/1972 | Dittmar | 260—309.2 |

FOREIGN PATENTS

| | | | |
|---|---|---|---|
| 1,523,597 | 3/1968 | France | 260—309.2 |

NATALIE TROUSOF, Primary Examiner

U.S. Cl. X.R.

260—157; 424—273